United States Patent Office 2,739,278
Patented Mar. 20, 1956

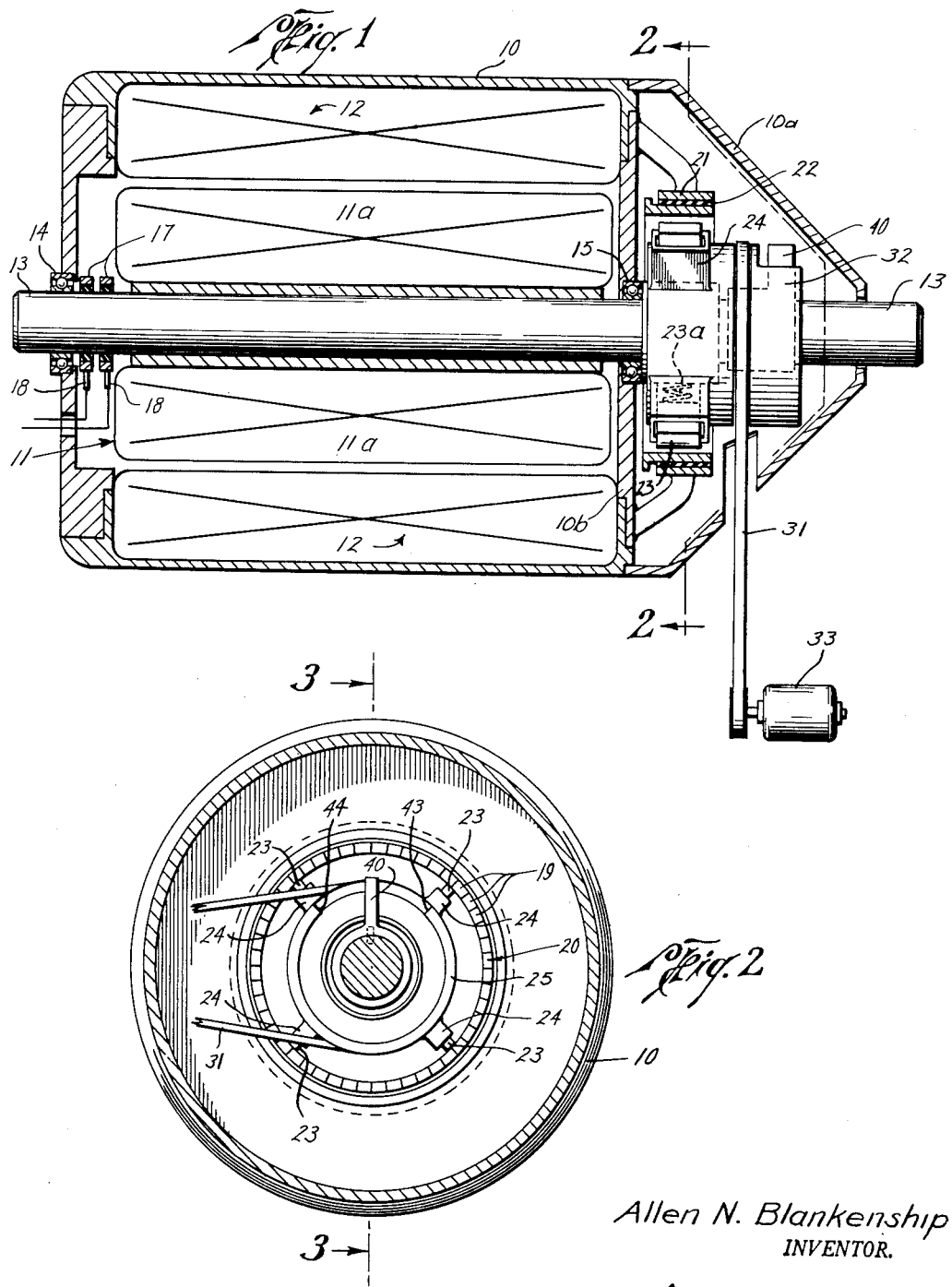
March 20, 1956
A. N. BLANKENSHIP
2,739,278
SLAVE MOTOR
Filed March 21, 1952
2 Sheets-Sheet 1
Allen N. Blankenship
INVENTOR.
BY Browning & Simms
ATTORNEYS March 20, 1956 A. N. BLANKENSHIP 2,739,278
SLAVE MOTOR
Filed March 21, 1952 2 Sheets-Sheet 2
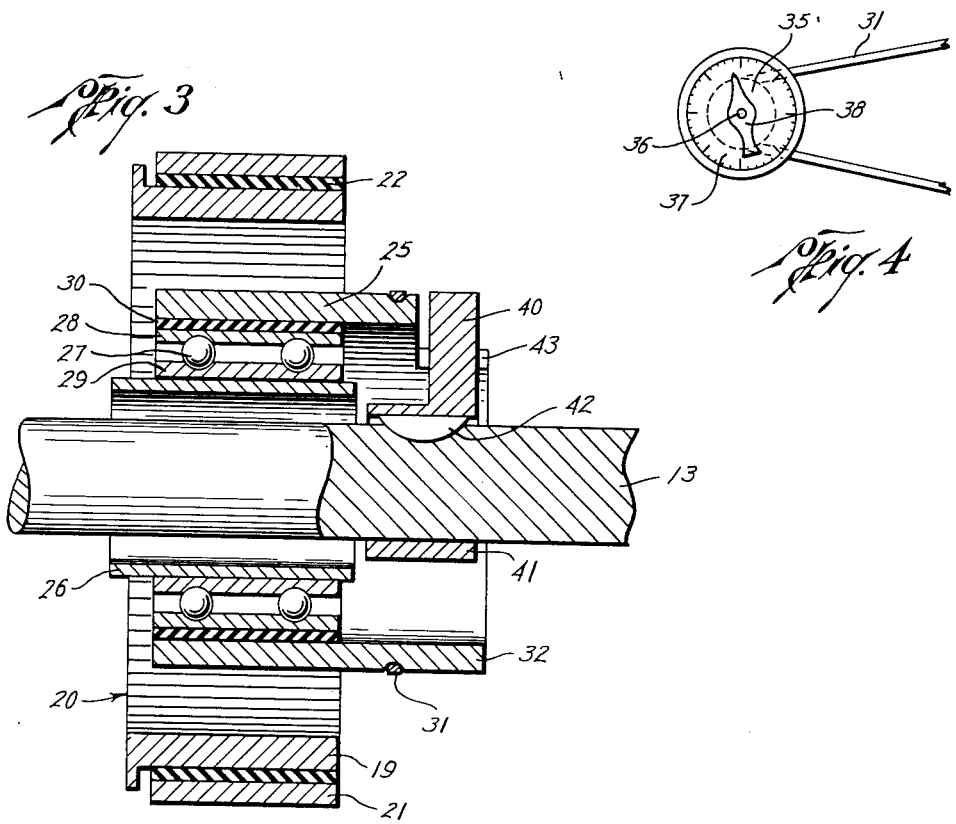
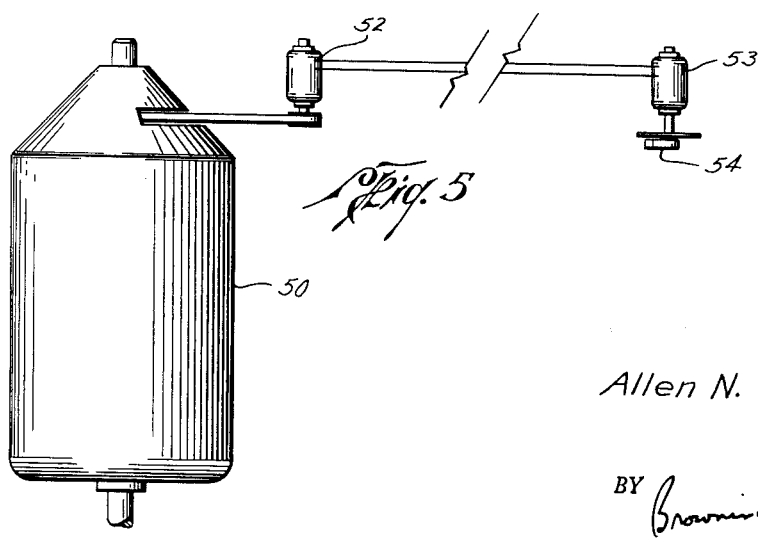
Allen N. Blankenship
INVENTOR.
BY Browning & Simms
ATTORNEYS

2,739,278

SLAVE MOTOR

Allen N. Blankenship, Seattle, Wash.

Application March 21, 1952, Serial No. 277,858

13 Claims. (Cl. 318—194)

This invention relates to a slave motor and in one of its aspects relates to a transducer wherein a torque producing force can control the speed and direction of rotation of an electric motor having characteristics particularly adapting it for such slave service.

In many instances, it would be advantageous to possess a slave motor having such characteristics that its rotative position, speed and direction of rotation are responsive to a control variable having an output capable of being translated into a torque. Such a motor could be employed in many services, such as for example, as a variable speed driver, a reversible driver, or as a positioning device for turning a shaft responsive to changes in a control variable. To be most fully effective, such a slave motor should have high torque output over a wide range of speed and should be capable of responding to a control torque of only a fraction of the slave motor's output.

It is an object of this invention to provide a slave motor which can be actuated by a control variable or driver to turn at any selected speed within a wide range or to revolve a fraction of a revolution responsive to such variable.

Another object of this invention is to provide a slave motor which can not only have its speed synchronized with that of a driver but also can have its direction of rotation responsive to that of such driver.

Another object of this invention is to provide a slave motor which will not only follow a driver in both speed and direction of rotation but which has a high torque output over a wide range of speeds varying from zero to an upper limit determined by the design characteristics of the motor.

Another object of this invention is to provide a slave motor whose operation is responsive to a driver and wherein variations in load on the motor will not be reflected or transmitted to the driver over a torque range from zero to pull-out torque.

Another object of this invention is to provide a slave motor capable of being controlled by a driver having only a relatively small output as compared to that of the slave motor so that very small forces can be translated or transduced into very large ones.

Another object of this invention is to provide a slave motor capable of being loaded to various degrees without affecting its speed and which has automatically self-adjusting loading characteristics.

Another object of this invention is to provide such a slave motor which is very quickly reversible in its direction of rotation and which can act as an effective brake should the speed of its driver suddenly be reduced.

Another object of this invention is to provide an alternating current slave motor having angularly fixed poles on an inducing member or rotor and an induced field in the stator with poles for repelling the poles of the inducing member, the location, speed of travel, and direction of rotation of the induced poles in the field being controlled independently of the inducing member.

Another object of this invention is to provide a slave motor whose speed, direction of rotation, and rotative position is determined by the independent rotation of brushes thereby permitting a mechanical movement to control the slave motor.

Another object of this invention is to provide a slave motor whose speed can be synchronized with that of a driver so as to be varied or held constant at any point within a wide speed range, the speed being independent of load changes on the slave motor up to pull-out torque.

Other objects, advantages and features of this invention will be apparent to one skilled in the art upon a consideration of the written specification, the appended claims and the attached drawings wherein:

Fig. 1 is a longitudinal cross-section, partially schematic, of a slave motor made in accordance with the principles of this invention and showing a driver for controlling the operation of the slave motor;

Fig. 2 is a full cross-section of the apparatus as viewed from the line 2—2 of Fig. 1;

Fig. 3 is a partial section taken along the line 3—3 of Fig. 2 and showing the structure of the commutator and brush carrier in particular;

Fig. 4 is a schematic showing of one type of driver adapted to be used in accordance with this invention; and Fig. 5 illustrates a system for controlling the operation of the slave motor of this invention.

Like characters of reference are used throughout the several views to designate like parts.

Referring now to the drawings, there is shown a frame or housing 10 and a dust cover 10a which can enclose the slave motor in a suitable manner. Disposed within the housing is a rotatable inducing member, which can be termed a rotor and which is designated generally by the numeral 11. An induced member or stator is carried by housing 10 and is designated generally by the numeral 12. Rotor 11 can comprise a shaft 13 rotatably carried by housing 10 by means of suitable anti-friction devices such as roller bearings 14 and 15. The rotor has disposed around its periphery coils 11a schematically illustrated in Fig. 1 and constructed and arranged in any conventional manner to provide an even number of magnetic poles on the rotor when energized by an alternating current source. The number of coils on the rotor depends upon the desired number of poles and as few as two can be employed. The rotor is provided with conventional slip rings 17 which are connected to the individual coils in a manner well known to those skilled in the art so as to provde north and south poles on the rotor which are fixed in angular position with respect to shaft 13. Also, brushes 18 are provided to cooperate with slip rings 17 to transmit an alternating current thereto from an external source not shown in the drawings. With this construction, it will be apparent that upon energization of the coils on the rotor, poles will be created thereon which will be mechanically rotated with the rotor at the same speed as the rotor and without changing their angular position with respect to shaft 13. The rotor is preferably of laminated construction but can be of any construction known to those skilled in the art to provide the poles as set forth above.

Induced member 12 can be comprised of any type of suitable field winding, such as a wave, lap, full pitch lap, fractional pitch lap or other appropriate design. The field winding is commuted by suitable connections or taps to segment 19 of commutator 20 which is carried by a ring 21 connected to end bell 10b of frame 10 to maintain the commutator in non-rotative position. Insulation 22 is employed between ring 21 and the commutator.

A plurality of brushes 23 are provided for cooperating with commutator 20 and are adapted to be rotated independently of rotor 11 or shaft 13. Brushes 23 are disposed to contact the inner peripheral surface of the commutator bars and can be biased outwardly by a suitable spring 23a which will augment the centrifugal force occurring upon rotation of the brushes with respect to the commutator and forcing the brushes into contact with the commutator. Each brush is carried in a brush housing 24, the housing extending from and being carried by a central rotatable member 25. The brush and the carrier assembly therefor, comprised of parts 23—23a, 24 and 25, are carried upon a portion of the housing, such as portion 26, by means of suitable anti-friction devices in the form of roller bearings 27 provided between races 28 and 29. The brush carrier can be insulated from the housing by means of insulation 30. It will be apparent from the foregoing that the brushes are electrically connected together by the brush carrier so that they can, in effect, short across arcuate sections of the field and commutator. The number of brushes must be sufficient to match the number of rotor poles and the particular winding arrangement used so that a field pole will be created opposite the rotor poles. The spacing apart of the magnets is such that the field poles will be angularly spaced apart equal to the angular spacing of the rotor poles. For example, a 4-pole rotor is indicated in the drawings and hence 4 brushes having a 90 degree spacing are used.

In accordance with this invention, the brushes are rotatable indepndently of shaft 13 and the rotor 11 (within limits determined by rotor pin 40 and stop parts 43 and 44) by the application of an external torque. Such torque can be applied, for example, by a belt 31 running over an extension 32 of the brush member. The belt, in turn, can be connected to a torque applying mechanism such as pilot motor or driver 33. Alternatively, instead of motor 33, a manually operated means, shown in Fig. 4, can be provided to position the brushes with respect to the commutator. In Fig. 4, pulley 35 carries belt 31 and has a shaft 36 extending through a dial face 37 to be affixed to a pointer handle 38. By changing the position of handle 38, belt 31 can be moved thereby turning the brushes with respect to the commutator.

In accordance with one aspect of this invention, cooperating stop parts are provided on the rotor and on the brush carrier for limiting the rotation of the brushes with respect to the rotor. One stop part can be provided by a radially extending member or rotor pin 40 carried on collar 41, the latter being keyed by key 42 to shaft 13 so as to rotate therewith. Rotor pin 40 extends outwardly into a slot cut in extension 32 of the rotatable brush carrying member 25. Member 25 has stop parts 43 and 44 angularly removed from each other and adapted to contact rotor pin 40 upon a predetermined rotation of the brush carrier with respect to the rotor to thereby retain the brush carrier within a predetermined rotative range with respect to shaft 13 and rotor 11. The location of the particular stop parts will be explained in detail below.

In operation, an alternating current source is connected to slip rings 17 via brushes 18 to energize the rotor windings and thereby create the pairs of poles on the rotor. The resultant flux cuts through the stator field winding and tends to induce voltage therein. No current flow results in the stator winding, and hence no stator poles are created, when the brushes are resting in soft neutral position. However, when the brushes are shifted or rotated from this position, as by belt 31, they contact commutator bars of unequal potential which results in a current flow, thereby creating stator poles. These poles are of the same sign as the most adjacent rotor poles and, since the rotor is free to rotate, it is repelled. If the load is increased on the rotor, the brushes rotate until they contact higher potential differences in the stator winding. This in turn results in an increase in stator current so that stronger magnetic fields are created which are closer to the stator field poles of like polarity. Thus a greater repulsion results thereby creating a greater torque for the increased load. The cumulative repulsion effect continues to increase until the stator poles are nearly radially aligned with the rotor poles, complete radial alignment being prevented by the limit pins. Or stated another way, when radially extending rotor pin 40 is angularly positioned at hard neutral position with respect to the brushes at soft neutral positions, it will float at such hard neutral position under no-load conditions and a minimum current will flow in the field. As the brushes are rotated, part 40 tends to float in hard neutral position, neglecting friction, windage, etc., losses. It is contemplated parts 43 and 44 and pin 40 can be in other positions than that shown. Thus, they can be shifted to any position as long as all three occupy the same relative position to each other. In well constructed motors of this invention, pin 40 will lag the brushes only two or three electrical degrees. Thus, rotor 11 will closely follow the rotation of the brushes and will be almost instantly reversible when the brushes are instantly reversed in their direction of rotation.

As load is applied to shaft 13, the brushes lead the soft neutral position more and more as the load is increased. The field current increases with applied load thereby strengthening the induced field poles and increasing their repulsion for adjacent rotor poles. Below design load, the increased strength of the field poles will be balanced out with the applied load so that rotor 11 will constantly lag behind the rotating field and brushes a fixed amount for any given load. Thus, additional current is drawn from the current source to compensate for increased load and the average speed of the rotor is not effected by varying load conditions. As a result, the slave motor of this invention is self-compensating for varying loads applied thereto.

It will be apparent from the foregoing that if the brushes are permitted to remain stationary, the rotor will assume a fixed position with respect thereto. At an angular position half-way between adjacent brushes is a point termed "hard neutral" position. Pin 40 is preferably angularly situated at this position to bisect the angle between adjacent brushes which are situated at soft neutral. Then as the brushes are rotated, pin 40 will "float" between stop parts 43 and 44 and will contact neither until the motor is sufficiently loaded to lag the rotor behind the field the required amount to cause such contact. By adjusting the spacing of the stop parts 43 and 44 from the pin 40 positioned at hard neutral, the amount of rotor lag upon loading of the motor and hence the amount of line current can be limited. While the maximum angular spacing of parts 43 and 44 will be equal to the angular spacing between adjacent brushes (i. e. the stop parts 43 and 44 being situated at soft neutral positions), such spacing can be made less to limit the current and torque output. In many instances, for example, a spacing of 15 to 25 electrical degrees for each stop part from the rotor pin at hard neutral position will be advantageous. In any event, the cooperating stop parts prevent a brush from being rotated past the hard neutral pin 40 thereby preventing magnetic pole slippage under extreme loading conditions.

In preferred operation, the motor would deliver full-rated torque, under load, without pin 40 touching either of stop parts. A gradually increasing load, past normal load ratings, will gradually force the rotor pin closer to one of stop parts 43 or 44, depending upon the direction of rotation and at a certain overload, the rotor pin will actually touch one of the stop parts on the brush carrier. If the overload is increased still further, the rotor pin will exert enough force against the particular brush carrier stop part in contact therewith to slow down the speed of rotation of the brushes and therefore also that of the rotor. If the overload is great enough, it will obviously reach pullout torque and the motor will stall until excess load is released. As soon as the excess load is released, the rotor will very rapidly resume the speed established by the pilot motor or driver. If the load is gradually decreased or suddenly released, the average rotor speed will not change since the relative position of the rotor to the field and, hence, the position of the rotor pin to stop parts 43 and 44 will merely readjust to the proper position for the load variation. Therefore, the slave motor will have substantialy no tendency to overrun the pilot motor or driver 33 when the load is gradualy or suddenly released.

In fact, should the speed of the brushes suddenly be decreased and should the motor be connected to apparatus having considerable rotative inertia, then the brushes will shift to the opposite side of soft neutral to effect a braking action on the apparatus being driven by the slave motor.

Should it be desired to reverse the direction of rotation of the slave motor, it is merely necessary to reverse the direction of rotation of the brushes. Almost instant rotor reversibility is achieved. The speed and load characteristics of the motor are the same in either direction of rotation since the rotor pin is set and the brushes operate without load midway between two hard neutral positions and at soft neutral positions.

The slave motor of this invention is also well adapted to operate as a positioning device. Thus, for example, the driver of Fig. 4 can be connected to drive the brushes and upon rotation of pulley 35 a partial revolution, the brushes will also be rotated a partial revolution and the rotor will follow the brush movement. Of course, if the starting torque required of the motor is high, allowance can be made for the rotor lag when turning pulley 35 to achieve the desired rotation of the rotor. The torque output of the motor will be high, and even can approximate design torque output at regular speeds, even if the rotor is to be rotated only a fraction of a revolution at a very low speed. Thus, it is possible with the slave motor of this invention to rotate a shaft requiring a large torque to turn by an initial control torque which is relatively minute. The control torque need be large enough merely to revolve the brushes and obviously, with proper construction of the brushes and brush carrier, the control torque can be quite small indeed.

Referring to Fig. 5, there is illustrated a slave motor 50 constructed in accordance with this invention and which has its brushes driven through belt 31 by a selsyn motor 52. Upon positioning of selsyn generator 53 as by manually operated pointer 54, selsyn 52 will be rotated a like amount thereby also rotating the brushes of the slave motor and causing the latter to rotate. Selsyn 53 can be positioned at a remote position from the slave motor and still control it. There are many obvious applications for such apparatus, one being the turning of a ship's rudder by the slave motor responsive to a signal input via selsyn 53 from a remote point.

It is further possible with the slave motor of this invention for it to ride on the line and drawing minimum current at no torque load or drawing just sufficient current to provide the torque necessary to offset tension of a load, such as a weight hanging from a crane powered by the slave motor. Adequate cooling by forced ventilation can be employed to make the motor suitable for this type of use.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An alternating current motor which comprises, in combination, a rotatable inducing member provided with a winding and means connectible to an alternating current source to create poles on said inducing member having a fixed angular position thereon, an induced member having a commuted winding inductively related to said inducing member, brushes electrically connected together and cooperating with said commuted winding and rotatable with respect thereto, and means for rotating said brushes independently of said inducing member at selective speeds to thereby in each instance responsively cause said inducing member to turn at the selected speed when said brushes have advanced sufficiently toward hard neutral to give enough torque to overcome the load on the motor.

2. An alternating current motor which comprises, in combination, a fixed commuted winding, a rotatable winding inductively related thereto, means for connecting said rotatable winding to an alternating current source to create pairs of poles thereon and brushes cooperating with said commuted winding and rotatable with respect thereto independently of said rotatable winding, said brushes being constructed to short circuit across said commuted winding to determine the rotative poistion of poles induced in said commuted winding and means for rotating said brushes independently of said rotatable winding at selective speed to thereby in each instance responsively cause said rotatable winding to turn at the selected speed when said brushes have advanced sufficiently toward hard neutral to give enough torque to overcome the load on the motor.

3. The motor of claim 2 in combination with stop parts rotatable with said rotatable winding and limiting rotation of said brushes with respect to said rotatable winding.

4. An alternating current motor which comprises, in combination, a wound rotor, a commuted wound stator inductively related to said rotor, brush means rotatable with respect to said commuted stator and short circuiting thereacross to create poles thereon whose position is dependent upon the rotative position of said brush means, means for rotating said brush means independently of said rotor, and electrical connections to said rotor for creating pole pairs thereon whose rotative position is fixed with respect to said rotor whereby hard and soft neutral rotate with the rotor and the rotor assumes a fixed position with respect to the brushes for a given load.

5. The motor of claim 4 in combination with stop parts carried by said rotor and said brush means to limit rotation of the brushes with respect to said rotor.

6. An alternating current motor which comprises, in combination, a wound stator having a commutator connected thereto, a rotor having a winding providing an even number of poles thereon and in inductive relation to said stator winding, slip rings for connecting said rotor winding to an alternating current source to have said poles fixed with respect to said rotor, a brush carrier including a pair of brushes cooperating with said commutator for each pair of poles on said rotor and short circuiting said stator winding to provide a rotatable field having angularly distributed poles spaced apart the same angular distance as the poles of said rotor and means for rotating said brush carrier and brushes independently of said rotor.

7. The apparatus of claim 6 wherein said brush carrier and said rotor have cooperating stop parts limiting the rotation of said brushes with respect to said rotor.

8. The motor of claim 7 wherein said stop parts carried by said rotor are spaced apart sufficiently to permit said brushes to rotate with respect to said rotor through an angle not greater than the angle between adjacent brushes.

9. The motor of claim 6 in combination with a stop part carried by said rotor at an angular position corresponding to hard neutral and stop parts carried by said brush carrier, the latter stop parts each being situated no further apart than soft neutral positions on each side of said hard neutral.

10. An alternating current motor which comprises, in combination, a frame, a wound field coil carried by said frame, a commutator connected to said field coil, a rotor mounted on a shaft in said housing, a winding on said rotor inductively related to said field coil, said rotor winding providing an even number of poles on said rotor, slip rings for providing alternating current to said rotor windings, a pair of brushes for each pair of poles on said rotor and having an angular spacing the same as the angular spacing of said poles on said rotor, said brushes being carried on a member rotatable with respect to said shaft and also being in electrical connection with each other, and means for rotating said brushes independently of said rotor.

11. The motor of claim 10 wherein said shaft carries a stop part extending outwardly between two spaced apart stop parts on said brush carrying member and free to move therebetween, the angle between the stop parts on said member being no greater than the angle between two adjacent soft neutral positions and the shaft stop part being angularly situated at hard neutral position between said soft neutral positions.

12. An alternating current motor which comprises, in combination, a frame, a rotor mounted on a shaft for rotation in said housing and wound to have an even number of poles, a wound field in said frame and inductively related to said rotor winding, a commutator tapped to said field, a pair of brushes electrically connected together for each pair of rotor poles and cooperating with said commutator, said brushes being mounted upon a member independently rotatable with respect to said rotor and said rotor shaft and having an angular spacing such as to create poles in said field under the inductive influence of an alternating current flowing in said winding on said rotor, a stop part carried by said rotor at a radial location intermediate that of an adjacent pair of brushes and stop parts carried by said rotatable member on either side of said rotor stop part and spaced apart at an angle no greater than the angle between said adjacent brushes to reduce the speed of the rotating brushes upon overloading of the motor.

13. An alternating current motor which comprises, in combination, a rotatable inducing member provided with a winding and means connectible to an alternating current source to create poles on said inducing member having a fixed angular position thereon, an induced member having a commuted winding inductively related to said inducing member, short circuiting means rotatable with respect to said commuted winding and cooperating therewith for creating poles thereon whose positions are dependent upon the rotative position of said short circuiting means, and means for rotating said short circuiting means independently of said inducing member at selective speeds to thereby in each instance responsively cause said inducing member to turn at the selected speed when said short circuiting means has advanced sufficiently toward hard neutral to give enough torque to overcome the load on the motor.

References Cited in the file of this patent

UNITED STATES PATENTS

| | | |
|---|---|---|
| 795,392 | Hill | July 25, 1902 |
| 1,253,157 | Creveling | Jan. 8, 1918 |
| 1,279,360 | Altes | Sept. 17, 1918 |
| 1,526,613 | Stephenson | Feb. 17, 1925 |
| 1,697,976 | Granat | Jan. 8, 1929 |
| 2,388,498 | Reinhard | Nov. 6, 1945 |

FOREIGN PATENTS

| | | |
|---|---|---|
| 585,883 | Great Britain | Feb. 27, 1947 |